May 12, 1970 W. L. KIBLER 3,511,943
CONTROL SWITCH FOR A VEHICLE WINDSHIELD WASHER AND WIPER SYSTEM
CONTAINED IN A TURN SIGNAL ACTUATING LEVER
Filed June 27, 1968 3 Sheets-Sheet 1
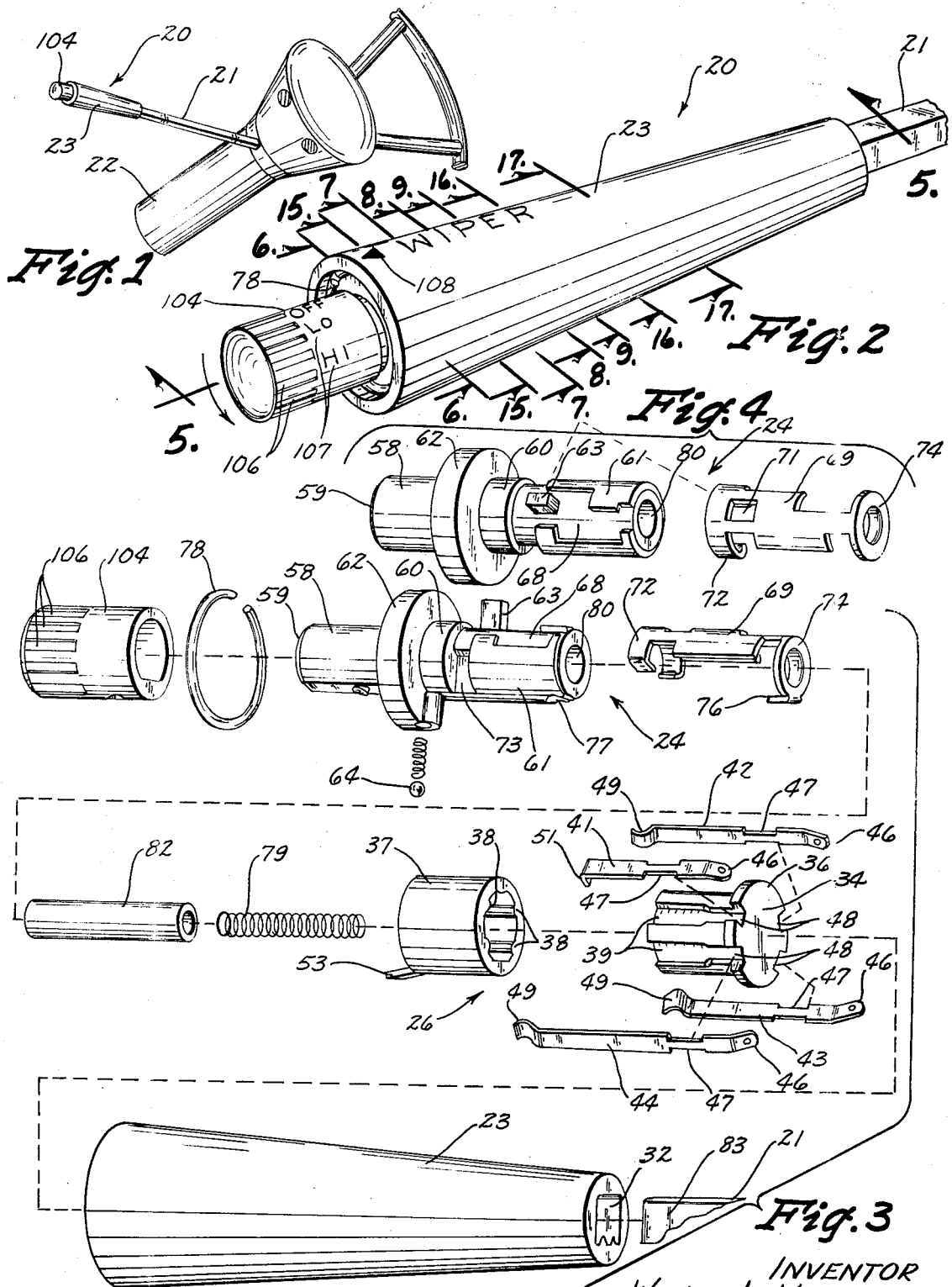
INVENTOR
WILLIS L. KIBLER
BY
Rudolph L. Lowell
ATTORNEY

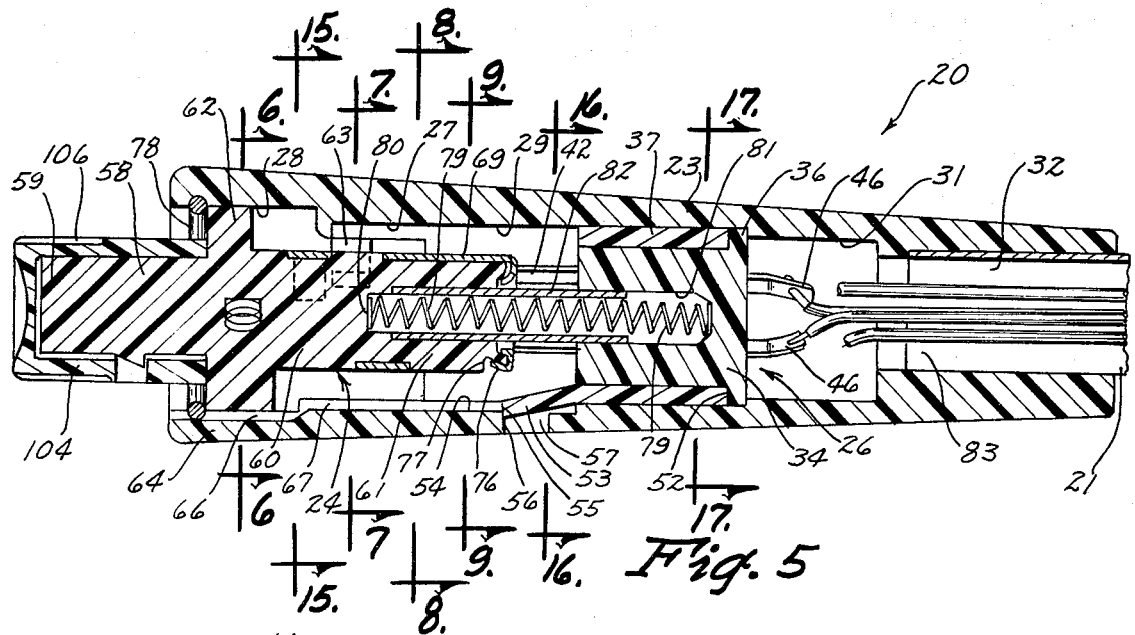
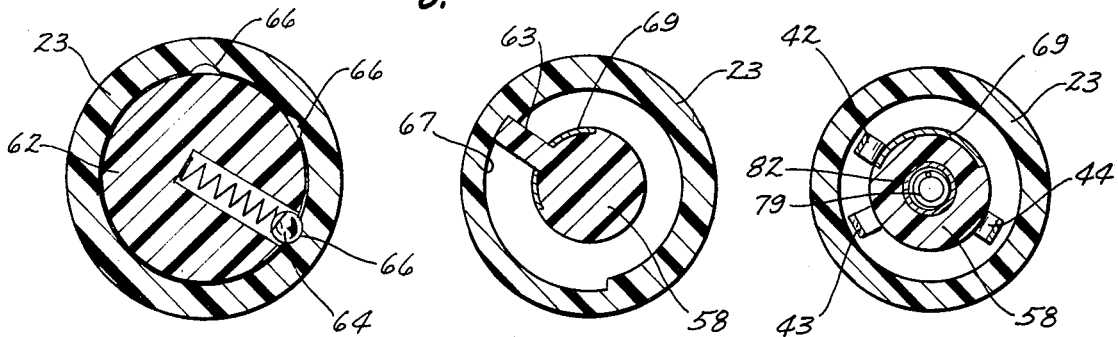
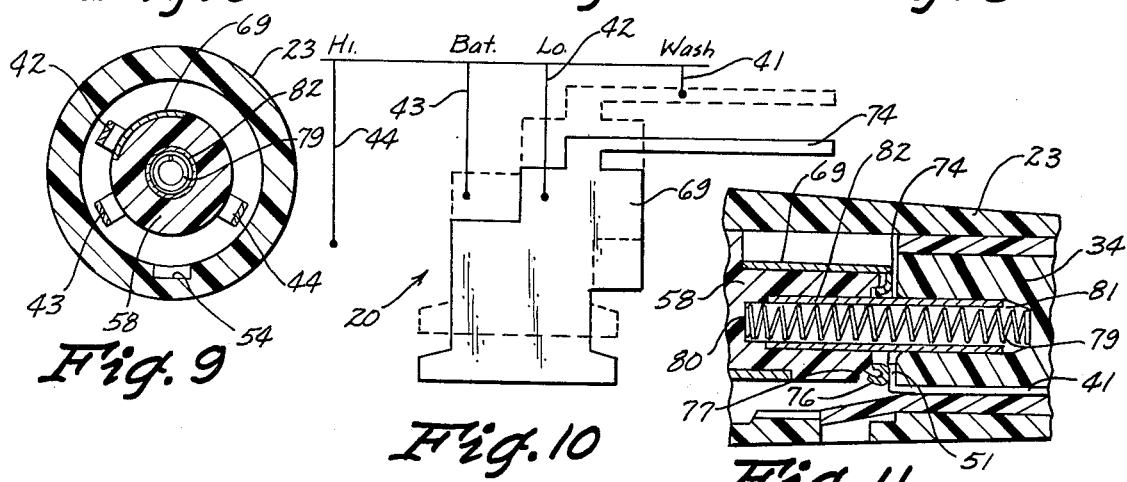

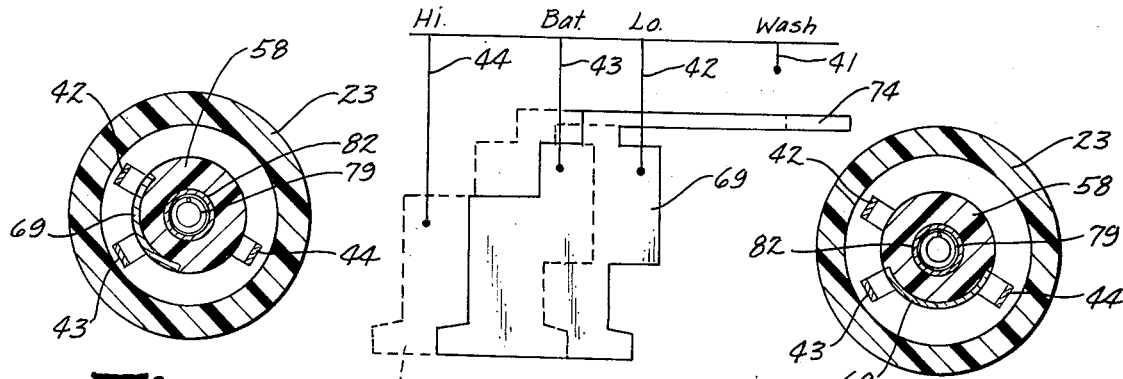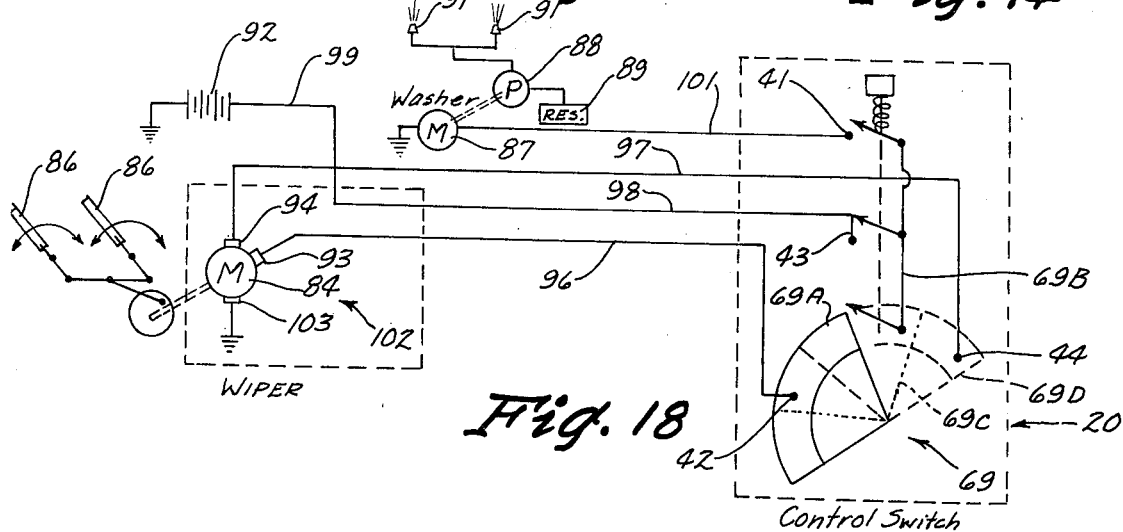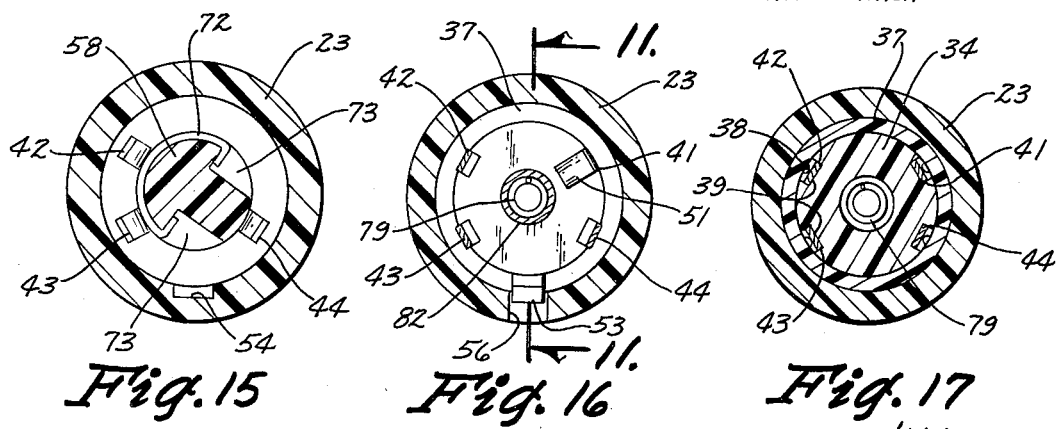

United States Patent Office 3,511,943
Patented May 12, 1970

3,511,943
CONTROL SWITCH FOR A VEHICLE WINDSHIELD WASHER AND WIPER SYSTEM CONTAINED IN A TURN SIGNAL ACTUATING LEVER
Willis L. Kibler, Detroit, Mich., assignor to McCord Corporation, Detroit, Mich., a corporation of Maine
Filed June 27, 1968, Ser. No. 740,505
Int. Cl. H01h 25/06
U.S. Cl. 200—4      4 Claims

ABSTRACT OF THE DISCLOSURE

The electric control switch for operating the windshield clearing system of a motor vehicle includes a housing member carried on the steering column of the vehicle so as to form an extension of the actuating lever of a usual turn signal indicator system. Within the housing member are a plurality of stationary contact fingers and a movable bridge contact member. The stationary contact fingers are electrically connected to a wiper motor, a washer pump motor and an electrical energy source and are selectively engageable on manual actuation of the bridge contact member, to operate the wiper motor alone or concurrently with the pump motor. The bridge member is mounted on a control shaft that has a control knob for rotatably and longitudinally moving the bridge contact member relative to the stationary contacts. The control shaft is yieldably held in a first longitudinally moved or rest position in which it is rotatable to predetermined rotated position to control the wiper motor from an "off" position, to positions of "low" and "high" speed operation and in the opposite longitudinal direction to a second longitudinally moved position. When the control shaft is in its rest position, and the wiper motor is in the "off" position longitudinal movement of the control shaft in one direction to a stop position provides for the concurrent operation of the washer motor and a "low" speed operation of the wiper motor. Lateral movement of the housing operates the turn signal indicator system in a usual manner.

SUMMARY OF THE INVENTION

The invention provides a control switch, for the windshield clearing system of a vehicle, that is mounted on the actuating lever for a turn signal indicator and is operable to give sole wiper operation or dual wiper and washer operation. The housing member for the switch forms an axial extension of the turn signal actuating lever and has a single control knob at its free end. The turn signals are operated in a usual manner by manually moving the housing member and lever as a single control arm. The control knob of the switch is conveniently accessible at the free or outer end of the housing. By merely rotating the control knob the wiper alone is operated. When the wiper is in an "off" position and the control knob is depressed within the housing the washer is operated concurrently with a low operation of the wiper. This concurrent operation continues for so long as the control knob is depressed. On release of the control knob the switch is automatically returned to an "off" position for both the wiper and washer. The vehicle operator can thus manually operate the control switch while keeping both hands closely adjacent the steering wheel and without taking his eyes off the road, so as to maintain maximum driving control when operating the windshield clearing system.

DETAILED DESCRIPTION OF THE INVENTION

Further objects and features of the invention will become apparent from the following description when taken in connection with the accompanying drawings wherein:

FIG. 1 is a perspective view of the control switch of this invention shown in assembly relation with the actuating lever of a usual turn signal indicator system on a motor vehicle;

FIG. 2 is an enlarged perspective view of the control switch;

FIG. 3 is an exploded perspective view of the control switch;

FIG. 4 is an exploded perspective view of a movable contact assembly that forms part of the control switch, and with such assembly being shown in a changed relative to its showing in FIG. 3;

FIG. 5 is a longitudinal sectional view of the control switch taken along the line 5—5 of FIG. 2;

FIGS. 6–9, inclusive, are sectional views as seen along the lines 6—6, 7—7, 8—8, and 9—9, respectively in FIGS. 2 and 5;

FIG. 10 is a developed view of a bridge contact member of the movable contact assembly showing schematically the relation thereto of contact fingers of a movable contact assembly that also forms part of the control switch;

FIG. 11 is a sectional view of the movable contact assembly and stationary contact assembly taken along the line 11—11 in FIG. 16;

FIG. 12 is a sectional view illustrated similarly to FIG. 9 showing the movable contact assembly in a changed rotated position;

FIG. 13 is illustrated similarly to FIG. 10 with the bridge contact member shown in a changed position relative to the contact fingers of the stationary contact assembly;

FIG. 14 is illustrated similarly to FIG. 8 with the movable contact unit shown in a changed rotated position;

FIGS. 15, 16 and 17 are sectional views taken along lines 15—15, 16—16 and 17—17, respectively, in FIGS. 2 and 5; and FIG. 18 is a schematic diagram of the electrical circuit for the control switch of the invention.

With reference to the drawings the electrical control switch of this invention, indicated generally at 20 in FIG. 1, is shown in assembly relation with an actuating lever 21 of a turn signal indicator system of a motor vehicle. The lever 21 is movably mounted in a usual manner on the vehicle steering column 22 for lateral movement in opposite directions from a neutral position to indicate vehicle turning. The switch 20 includes an elongated tubular housing member 23 that is mounted on the lever 21 to form a handle extension on the lever. Located within the housing member 23 (FIG. 5) are a movable contact assembly 24 and a stationary contact assembly 26. The movable contact assembly 24 is supported in the housing member 23 for rotatable and longitudinal movement relative to the stationary contact assembly 26 to provide for the actuation of the wiper system of the vehicle independently of or concurrently with the washer system.

The housing member 23 (FIG. 2) is of a generally cone shape tapered inwardly toward the actuating lever 21 of the turn indicator system. An axial bore 27 formed in the housing member has an outer section 28 open to the large end of the housing member, an intermediate section 29 of a reduced diameter relative to the outer section, and an inner section 31 of a reduced diameter relative to the intermediate section 29. The inner section 31 is open to a wire receiving passage 32 through which lead wires are extended into the actuating lever 21 and through the steering column 22 in a well-known manner.

The stationary contact assembly 26 includes a contact mounting unit (FIG. 5) comprising a cylindrical plug member 34 having an annular flange 36 at its inner end. The plug member 34 is positioned within a sleeve member 37 of a length substantially coextensive with the plug member and having a wall thickness equal to the radial length of the flange 36. As shown in FIG. 3 the inner peripheral surface of the sleeve member is formed with four axially extended splines 38 for reception within four corresponding axially extended grooves 39 formed in the outer peripheral surface of the plug member 34. The splines 38 and grooves 39 (FIGS. 3 and 17) are arranged in diametrically opposite pairs, with the grooves in each pair circumferentially spaced equal distances apart, and with each pair of grooves circumferentially spaced apart equal distances that are greater than the distance between the grooves in a pair. In one embodiment of the invention the grooves 39 in a pair are spaced sixty degrees apart, and the pairs of grooves are spaced apart one hundred and twenty degrees.

Corresponding in number to the grooves 39 are four contact fingers 41, 42, 43 and 44 (FIG. 3). These contact fingers are of the same general configuration and are formed from a flat strip conductor material. The contact finger 41 is of a short length, the fingers 42 and 43 of an intermediate length, and the finger 44 is of a long length. The lead connecting or terminal ends 46 of the contact fingers are of a like construction, and each finger adjacent its terminal end 46 has a section 47 of a reduced width. Each groove 39 has a corresponding section 48 of a reduced width. The fingers 42, 43, and 44 are formed with sliding contact ends 49 while the finger 41 has an abutting contact end 51.

The contact fingers are located in the grooves 39 with their reduced sections 47 located in the reduced groove sections 48 whereby the terminal ends 46 of the contact fingers extend outwardly from the flanged end of the plug member 34, and the contact ends 41 and 51 extend outwardly from the opposite end of the plug member. With the contact fingers thus positioned in the plug member 34 the sleeve member 37 is slipped over the plug member into abutting engagement with the flange 36 whereby to lock the contact fingers 41–44, inclusive, in fixed relative positions. As shown in FIG. 3 the intermediate length contact fingers 42 and 43 are arranged in one pair of the grooves 39 so as to be diametrically opposite the long contact finger 44 and the short contact finger 43, respectively, which are located in the other pair of grooves 39.

The stationary contact assembly 26 is located in the inner end of the housing bore section 29 (FIG. 5) with the flange 36 in abutting engagement with an annular shoulder 52 that is formed at the junction of the bore sections 29 and 31. The contact assembly 26 is thus held against movement in an axial direction toward the inner end of the housing member 23.

To hold the stationary contact assembly 26 against axial movement in an opposite direction the sleeve member 37 (FIGS. 3 and 5) is formed at the end thereof opposite the flange 36 with a longitudinally extended flexible tab or stop member 53 that is inclined outwardly from the sleeve member 37. On insertion of the stationary contact assembly 26 within the housing member 23 into abutting engagement with the shoulder 52, the stop member 53 is guidably received within a guideway 54 (FIGS. 5 and 9) formed in the inner peripheral surface of the bore section 29, to a position wherein the free end 55 of the tab member 53 is movable into releasable engagement with the side wall 56 of a radially extended opening 57 formed in the housing member 23 (FIGS. 5 and 16). This engagement of the flexible tab member 53 with the opening side wall 56 locks the stationary contact assembly 26 against rotational movement within the bore section 29 concurrently with holding the assembly 26 against longitudinal movement outwardly of the housing bore section 29.

The movable contact assembly 24 (FIGS. 3 and 5) includes a control shaft 58 that has an outer end section 59 projected outwardly from the housing 23, and an inner end section 60 located within the housing bore section 29 and terminating at a position adjacent to the plug member 34 of the stationary contact assembly 26. An intermediate section 61 of the control shaft 58, located within the bore sections 28 and 29, is integrally formed with an annular bearing member 62 of an enlarged diameter. The bearing member 62 is positioned in the housing bore section 28 and has its outer peripheral surface in bearing engagement with the side wall of the bore section 28.

Spaced inwardly from the bearing member 62 and located within the housing bore section 29 is a radially extended stop leg 63. The bearing member 62 (FIGS. 5 and 6) carries a spring pressed ball member 64 that is biased radially outwardly from the bearing member. On rotation of the control shaft 58 the ball member 64 is selectively movable into yieldable engagement with one of a series of three axially extended grooves 66 that are formed in the side wall of the bore section 28 and are circumferentially spaced sixty degrees apart.

The free end of the stop leg 63 (FIG. 7) is ridable within a circumferentially and axially extended depression 67 that is formed in the side wall of the housing bore section 29. The circumferential length of the depression 67 is equal to the one hundred twenty degree angular distance between the outer ones of the ball receiving grooves 66, and its axial length is equal to at least the longitudinal travel of the control shaft 58. The engagement of the stop leg 63 with the opposite sides of the depression 67 thus limits the rotational movement of the control shaft 58 between the outer ball receiving grooves 66 at any longitudinally moved position of the control shaft 58.

The inner end section 61 of the control shaft 58 is formed in its peripheral surface (FIGS. 3 and 4) with a depressed cut out section 68 that is of an irregular shape and extends axially and circumferentially of the shaft sectioin 61 and about the stop leg 63. A bridge contact member 69 corresponding in shape to the depressed section 68 fits in a mating relation therein within the peripheral confines of the shaft section 61. As shown in FIG. 4 the bridge contact member 69 has an opening 71 for receiving the stop leg 63 and at the end thereof adjacent the bearing member 62 is integrally formed with an arcuate clip member 72 for coacting locking engagement with clip receiving sockets 73 (FIGS. 3 and 15) that are formed in the control shaft 58. The opposite end of the bridge contact member 69 terminates in a contact member 74 (FIGS. 3 and 4) of a flat ring shaft that extends transversely of the shaft 58 in a covering relation with the inner end face of the shaft as shown in FIGS. 5 and 11. The contact member 74 includes a clip member 76 that is extended axially of the control shaft 58 for interlocking engagement with the shaft at a cut out portion 77 (FIGS. 3 and 5).

The movable contact assembly 24 (FIG. 5) is held within the housing member 23 by a retaining ring 78 located within the housing bore section 28 for engagement with the bearing member 62. The bearing member is yieldably urged into engagement with the retainer ring 78 by a coil spring 78 arranged in compression between the movable contact assembly 24 and the stationary contact assembly 26. The opposite ends of the spring 79 are received within axial bores 80 and 81 formed in the control shaft 58 and plug member 34, respectively, and is maintained in axial alignment with the shaft 58 and plug member 34 by a guide sleeve 82 extended between and slidably supported in the bores 80 and 81.

As thus far described it is seen that the movable contact assembly 24 is yieldably held in a first longitudinally moved or rest position against the retainer ring 78 by the spring 79, and in such rest position is rotatably movable to selected rotated positions determined by the reception of the spring pressed ball 64 into one of the grooves 66. In this rest position, and as shown in FIGS. 5 and 8, the contact fingers 42, 43 and 44 are extended over the inner end section 61 of the control shaft 58 so as to be in slidable contact engagement with either the contact bridge member 69 or the control shaft 58. On longitudinal movement of the control shaft 58 inwardly of the housing member 23, to its position shown in FIG. 11, the contact fingers 42, 43 and 44 remain in slidable engagement with the contact bridge member 69 or the inner end section 61 of the control shaft and the short contact finger 41 is brought into engagement with the contact ring 74 of the bridge member 69. This engagement of the contact ring 74 with the contact finger 41 limits the inward movement of the control shaft 58 to an inner or second longitudinally moved position therefor.

The actuating lever 21 (FIGS. 2 and 3) of the turn indicator signal system is of an inverted channel shape having its end 83 receivable within the wire receiving passage 32 of the housing member 23 for locking engagement with the side wall thereof in any suitable manner. Lead wires, from the steering column 22 are passed through the lever 21 and the passage 32 for connection to the terminal ends 46 of the contact members 41, 42, 43 and 44.

The lead wires are electrically connected to the windshield clearing system as shown schematically in FIG. 18. This system includes a wiper system having an electric wiper motor 84 operatively associated with wiper blades 86 to oscillate the blades across the vehicle windshield in a usual manner. A washer system includes an electrical motor 87 for driving a pump 88 to supply fluid under pressure from a reservoir 89 to nozzles 91 which direct the fluid onto the windshield in the path of movement of the wiper blades 86. The motors 84 and 87 are operated from a usual vehicle battery indicated at 92.

The contact fingers 42 and 44 are connected to the low and high speed terminals 93 and 94 on the wiper motor 84 by leads 96 and 97, all respectively. The battery 92 is connected to the contact finger 43 by leads 98 and 99 and the pump motor 87 is connected to the finger 41 through the lead 101. The bridge contact member 69 of the control switch 20 is illustrated for rotational movement at 69A and for longitudinal movement at 69B for correspondence with the rotational and longitudinal movement of the control shaft 58 in the housing member 23.

The operation of the wiper motor 84 takes place in response to a rotation of the control shaft 58 to selected rotated positions as determined by the reception of the spring pressed ball 64 in the ball receiving groove 66 (FIG. 6). These rotated positions correspond to a first or "off" position of the wiper motor 84, a second or "low" wiper speed position and a third or "high" wiper speed position. As shown in FIG. 18 the control switch 20 is in the "off" position of the wiper motor. On rotation of the bridge contact member 69, in a clockwise direction, as viewed in FIG. 18, to its dotted line position, indicated at 69C, the "low" speed terminal 93 of the wiper motor 84 is connected to the battery 92 through lead 96, contact number 69 and leads 98 and 99. For a "high" speed operation of the motor 84 the bridge contact member 69 is rotated from its dotted line position 69C to the dash line position 69D. In this latter position the "high" speed terminal 94 of the motor is connected with the battery 92 through lead 97, contact member 69 and leads 98 and 99. On a return of the bridge contact member 69 to its full line position in FIG. 18 the motor 84 is shut off.

With the control switch 20 in its off position of FIG. 18, the washer motor 87 is concurrently operated with the wiper motor 84 by merely longitudinally moving the bridge contact member 69, downwardly as viewed in FIG. 18. The washer motor 87 is then connected to the battery 92 through lead 101, contact member 69 and leads 98 and 99. Connection of the "low" speed terminal 93 of the wiper motor with the battery is through lead 96, contact member 69 and leads 98 and 99. In this respect it is to be noted that washer operation may be effected concurrently with wiper operation at any selected rotated position of the contact member 69.

As shown in FIG. 10 the positions of the contact fingers 41–44, inclusive are diagrammatically illustrated relative to the bridge contact member 69, which is shown in developed form, for an "off" position of the control switch 20. This same relation is shown in FIG. 9. In such "off" position only the "low" wiper speed contact finger 42 is in engagement with the bridge contact member 69, with the contact fingers 43 and 44 being in engagement with the outer peripheral surface of the control shaft 58, and with the washer contact finger 41 separated from the ring contact member 74. Both the wiper motor 84 and the washer motor 87 are thus shut off.

On longitudinal movement of the control shaft 58 inwardly of the housing member 23 to a stop position, shown in FIG. 11, as defined by the engagement of the ring contact 74 with the washer finger contact member 41, the bridge contact member 69 is moved to its dotted line position shown in FIG. 10. As a result of this movement the "low" wiper speed contact finger 42 remains engaged with the bridge contact member 69, the battery contact finger 43 is engaged by the bridge contact member 69, the washer contact finger 41 is engaged by the ring contact 74 on the member 69. The wiper motor 84 is thus operated at low speed concurrently with the operation of the washer motor 87.

With the control switch 20 in its "off" position, shown in FIG. 10, and "low" speed wiper operation only is wanted, the control shaft 58 is rotated to a "low" position therefor whereby the bridge contact 69 is moved from its full line position in FIG. 10 to its full line position shown in FIG. 13. In this "low" speed position of the control shaft 58 (FIG. 12) the "high" wiper speed contact finger 44 is engaged by the outer peripheral surface of the shaft.

On the continued rotation of the control shaft 58 from its "low" speed position in FIG. 12 to a "high" speed position in FIG. 14, the "low" wiper speed contact finger 42 is engaged by the outer peripheral surface of the shaft 58, and the "high" wiper speed contact finger 44 and the battery contact finger 43 are engaged by the bridge contact member 69.

This "high" speed position of the control shaft 58 in FIG. 14 corresponds to the dotted line showing of the bridge contact member 69 in FIG. 13. The circuit of the wiper motor 84 is thus closed through its high speed terminal 94. Also, as clearly appears in FIGS. 10 and 13, the longitudinal movement of the control shaft 58 when in any one of its "off," "low" wiper speed or "high" wiper speed rotated positions, to its stop position in FIG. 11 will provide for concurrent washer and wiper operation.

To facilitate the movement of the control shaft 58 its outer end section 59 is provided with an end cap 104 formed on its outer peripheral surface with finger gripping portions 106. As shown in FIG. 2 the cap member 104 also carries "off," "low" and "high" markings 107 for movement relative to an arrow marking 108 on the housing member 23. The rotated position of the control shaft 58 is thus readily observable by the vehicle operator, along with the reaching of a rotated position being indicated by the feel of the spring pressed ball 64 dropping into a ball receiving groove 66.

Although the invention has been described with respect to a preferred embodiment thereof it is to be understood that it is not to be so limited since changes and modifications can be made therein within the scope of the invention as defined in the appended claims.

I claim:

1. The combination of an electric control switch for a vehicle windshield clearing system with a turn signal indicating device, wherein the clearing system includes a wiper means operated by an electric wiper motor, a washer means including a pump operated by an electric motor, and a source of electrical energy, and wherein said turn signal device includes an actuating lever supported for lateral movement on the vehicle steering column comprising:
(a) a handle for said actuating lever comprising an elongated housing member mounted on and extended axially from the outer end of said actuating lever for lateral movement therewith,
(b) said housing member having an axial bore therein,
(c) a movable contact assembly having a shaft member movably supported in the bore of said housing member for rotational and longitudinal movement and including a bridge contact member extended circumferentially and axially about one end of said shaft member,
(d) a stationary contact assembly mounted in said bore including a plurality of arcuately spaced electrical contact fingers selectively engageable with said bridge contact member in response to rotational and longitudinal movement of said shaft member,
(e) means for biasing said shaft member in one direction to a first longitudinally moved position wherein the one end thereof is axially spaced from said stationary contact assembly, and
(f) manually actuated means at the opposite end of said shaft member operable independently of said actuating lever to longitudinally move said shaft member toward said stationary contact assembly to a second longitudinally moved position and for rotating said shaft member to predetermined rotated positions therefor,
(g) said wiper motor and said washer motor being inoperative when said shaft member is in one rotated position in the first longitudinally moved position therefor, said wiper motor only being operative on rotation of said shaft member to the other of said rotated positions when the shaft member is in the first longitudinally moved position therefor, and said two motors being simultaneously operated on movement of said shaft member from the first longitudinally moved position to the second longitudinaly moved position, when the shaft member is in said one rotated position.

2. The combination of an electric control switch for a vehicle windshield clearing system with a turn signal indicating device as defined in claim 1 wherein:

(a) said actuating lever has a longitudinal passage therein open to the bore in said housing member, and
(b) lead wires connected to said two motors and said source of electrical energy extended through said steering column and actuating lever for connection with said stationary contact assembly.

3. The combination of an electric control switch for a vehicle windshield clearing system with a turn signal indicating device as defined in claim 1 wherein:
(a) said shaft member has a central portion of enlarged diameter in bearing engagement with the side wall of said axial bore, and said one end thereof formed in the peripheral surface thereof with a depressed portion corresponding in size and shape to said bridge contact member, whereby the contact surface of said bridge member is continuous with said peripheral surface.

4. The combination of an electric control switch for a vehicle windshield clearing system with a turn signal indicating device as defined in claim 3 including:
(a) coacting means on the central portion of said shaft member and on the side wall of said axial bore for releasably holding the shaft member in a rotated position while permitting longitudinal movement thereof axially of said bore.

References Cited
UNITED STATES PATENTS

| | | | |
|---|---|---|---|
| 2,263,754 | 11/1941 | Batcheller | 200—4 |
| 2,992,448 | 7/1961 | Simpson | 15—250.02 |
| 3,187,117 | 6/1965 | Dyksterhouse | 200—4 |
| 3,188,678 | 6/1965 | Mandy et al. | 15—250.02 |
| 3,254,168 | 5/1966 | Peterson | 200—61.27 |
| 3,413,427 | 11/1968 | Radomski et al. | 200—61.34 |

ROBERT S. MACON, Primary Examiner

R. A. VANDERHYE, Assistant Examiner

U.S. Cl. X.R.

15—250.02; 200—61.27, 61.54